(12) United States Patent
Pfeifer

(10) Patent No.: US 7,708,836 B2
(45) Date of Patent: May 4, 2010

(54) DEVICE AND METHOD FOR TESTING THE EFFICIENCY OF AN ULTRASONIC CLEANER

(75) Inventor: Martin Pfeifer, Waldkraiburg (DE)

(73) Assignee: PEREG GmbH, Waldkraiburg (DE)

( * ) Notice: Subject to any disclaimer, the term of this patent is extended or adjusted under 35 U.S.C. 154(b) by 500 days.

(21) Appl. No.: 10/180,445

(22) Filed: Jun. 26, 2002

(65) Prior Publication Data

US 2002/0195120 A1 Dec. 26, 2002

(30) Foreign Application Priority Data

Jun. 26, 2001 (DE) ................. 101 30 682

(51) Int. Cl.
*B08B 7/04* (2006.01)
*B08B 3/12* (2006.01)
*G01H 17/00* (2006.01)

(52) U.S. Cl. .............................. 134/18; 134/1; 134/184; 134/200; 134/201; 73/1.82; 73/1.83; 73/1.86; 73/649

(58) Field of Classification Search .................... 134/1, 134/18, 200, 201, 184; 73/1.83, 649, 1.82, 73/1.86
See application file for complete search history.

(56) References Cited

U.S. PATENT DOCUMENTS

| | | | | |
|---|---|---|---|---|
| 1,870,140 A * | 8/1932 | Piette | ........................... | 73/649 |
| 2,941,908 A * | 6/1960 | Logan | ............................. | 134/1 |
| 2,994,332 A * | 8/1961 | Leonhardt | .................... | 134/184 |
| 3,134,728 A * | 5/1964 | Goldsmith | .................. | 205/775 |
| 5,040,489 A * | 8/1991 | Drake | .......................... | 119/246 |
| 5,491,408 A * | 2/1996 | Rousseau | ................... | 324/71.1 |
| 5,535,702 A * | 7/1996 | Idbeis | ......................... | 119/247 |
| 5,660,909 A * | 8/1997 | Tachibana et al. | ............. | 428/76 |
| 5,962,773 A * | 10/1999 | Cho | ........................... | 73/1.86 |
| 5,972,713 A * | 10/1999 | Kuzuhara et al. | ........... | 436/125 |
| 6,378,536 B1 * | 4/2002 | Liaw et al. | .................. | 134/113 |
| 6,450,184 B1 * | 9/2002 | Azar | ......................... | 134/57 R |
| 6,543,272 B1 * | 4/2003 | Vitek | .......................... | 73/1.83 |

FOREIGN PATENT DOCUMENTS

| DE | 3742478 A1 * | 6/1989 |
|---|---|---|
| DE | 44 10 032 A1 | 10/1994 |
| WO | WO 95/10054 | 4/1995 |

OTHER PUBLICATIONS

Falbe, J. and Regitz, M., brief description of "Ultrasonic Chemistry," 1999, p. 4736/4737.

* cited by examiner

*Primary Examiner*—Alexander Markoff
(74) *Attorney, Agent, or Firm*—Heslin Rothenberg Farley & Mesiti P.C.

(57) ABSTRACT

A device and method that enables the reliable and reproducible testing of the cleaning efficiency of an ultrasonic cleaning device is disclosed.

18 Claims, 2 Drawing Sheets

DEVICE AND METHOD FOR TESTING THE EFFICIENCY OF AN ULTRASONIC CLEANER

CLAIM FOR FOREIGN PRIORITY

This application claims foreign priority benefits from DE 101 30 682.2, filed Jun. 26, 2001. The entire contents of the prior application is incorporated herein by reference.

FIELD OF THE INVENTION

The invention relates to a device and a method for testing the efficiency of an ultrasonic cleaning device.

BACKGROUND OF THE INVENTION

Ultrasonic cleaning devices are commonly employed in the cleaning of medical instruments, especially those comprising a plurality of undercuts. In the use of an ultrasonic cleaning device, the contaminated instruments are placed in a basin of water which is then exposed to ultrasonic energy, that generates ultrasonic waves in the water. The waves produce cavitation in the water, resulting in the creation of cavitation bubbles, which ultimately collapse. As the bubbles collapse, they become convoluted on one side due to a jet of fluid that shoots through the bubble at high speed as it collapses. The jet of fluid then hits on the opposite side of the bubble, often at speeds of up to 500 m/s. The cleaning effect of the device results from the jets of fluid, which hit the contaminated instruments at these high speeds, and thereby remove impurities from the instrument surfaces.

Due to the non-homogeneous distribution of ultrasonic waves in the basin, regions of both low cavitation density and high cavitation density are created. Naturally, the regions having a high cavitation density will yield a higher cleaning efficiency than the lower cavitation density. Unfortunately, because the movement of the ultrasonic waves is not visible and the cavitation bubbles are very difficult to see, it is not possible to identify the regions having a high cavitation density, and therefore a high cleaning efficiency solely by observing the water in the cleaning basin.

One known method of testing the efficiency of ultrasonic cleaning devices involves the immersion of thin, conventional aluminum foil into the water basin. As cavitation occurs, small holes are created in the foil by the cavitation bubbles, whereby it is possible to identify the density of areas of cavitation. The disadvantage of this method is that it does not provide an objective and reproducible test parameter, for the user to reliably judge the efficiency of the ultrasonic device.

It is therefore desirable to provide a device and method that enables the reliable and reproducible testing of the cleaning efficiency of an ultrasonic cleaning device. As described in detail herein, the present invention provides such a device and method.

SUMMARY OF THE INVENTION

According to the principles of the present invention, a device and method are provided that enable reliable and reproducible testing of the cleaning efficiency of an ultrasonic cleaning device. The testing device comprises a vessel containing at least one fluid that undergoes a visibly discernable change in color or color intensity upon exposure to collapsing cavitation bubbles produced by the movement of ultrasonic waves generated by the ultrasonic cleaning device. A wall of the vessel is constructed to include at least a portion that is transparent, and the vessel further comprises a cavitation promoter comprising glass beads or quartz sand.

Various embodiments of the principles of the invention are described in further detail in the sections that follow, as well as in the accompanying drawings.

DETAILED DESCRIPTION OF THE INVENTION

Figure 1:
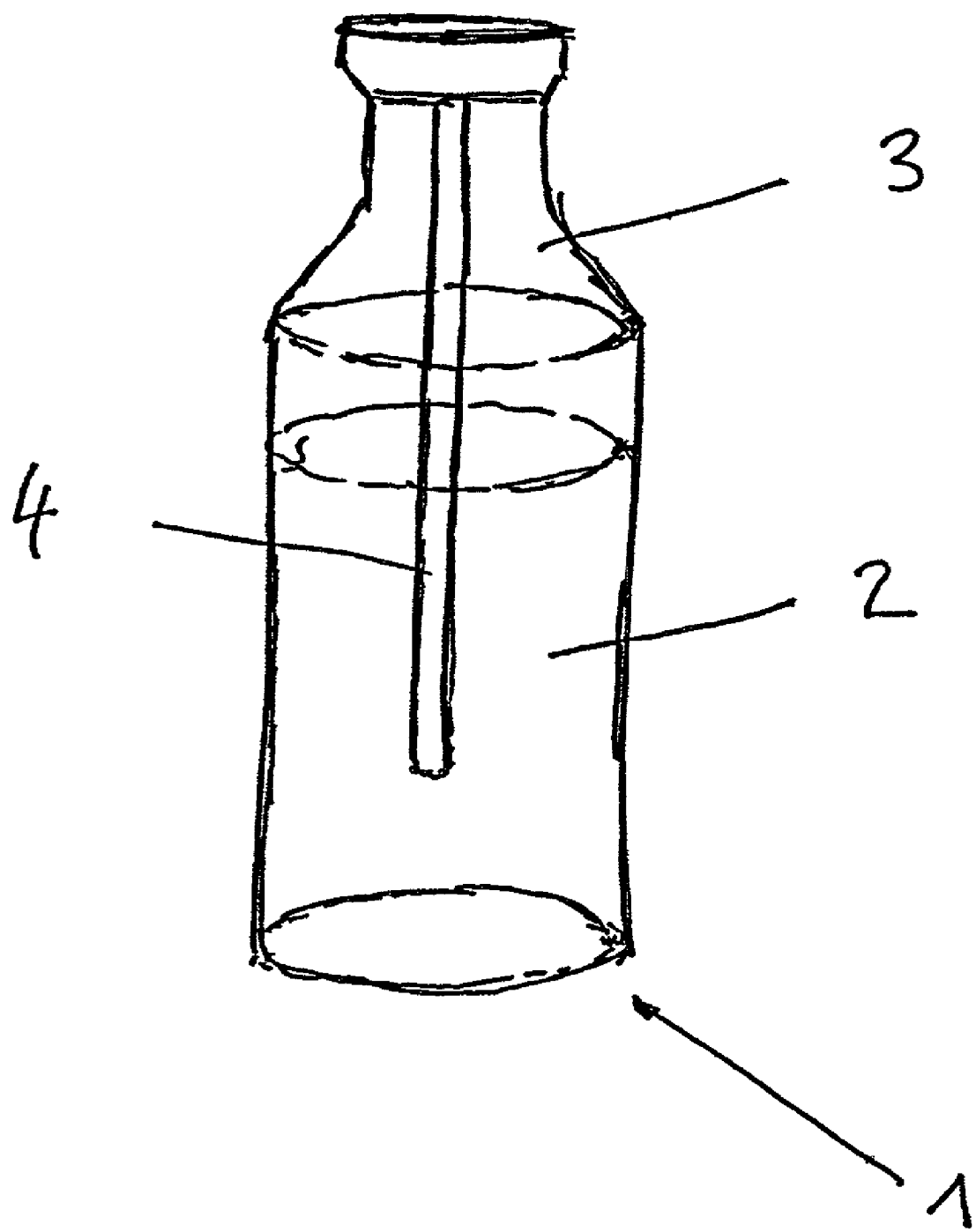
FIG. 1 depicts an embodiment of the testing device of the present invention, wherein the cavitation promoter comprises a rod.
Figure 2:
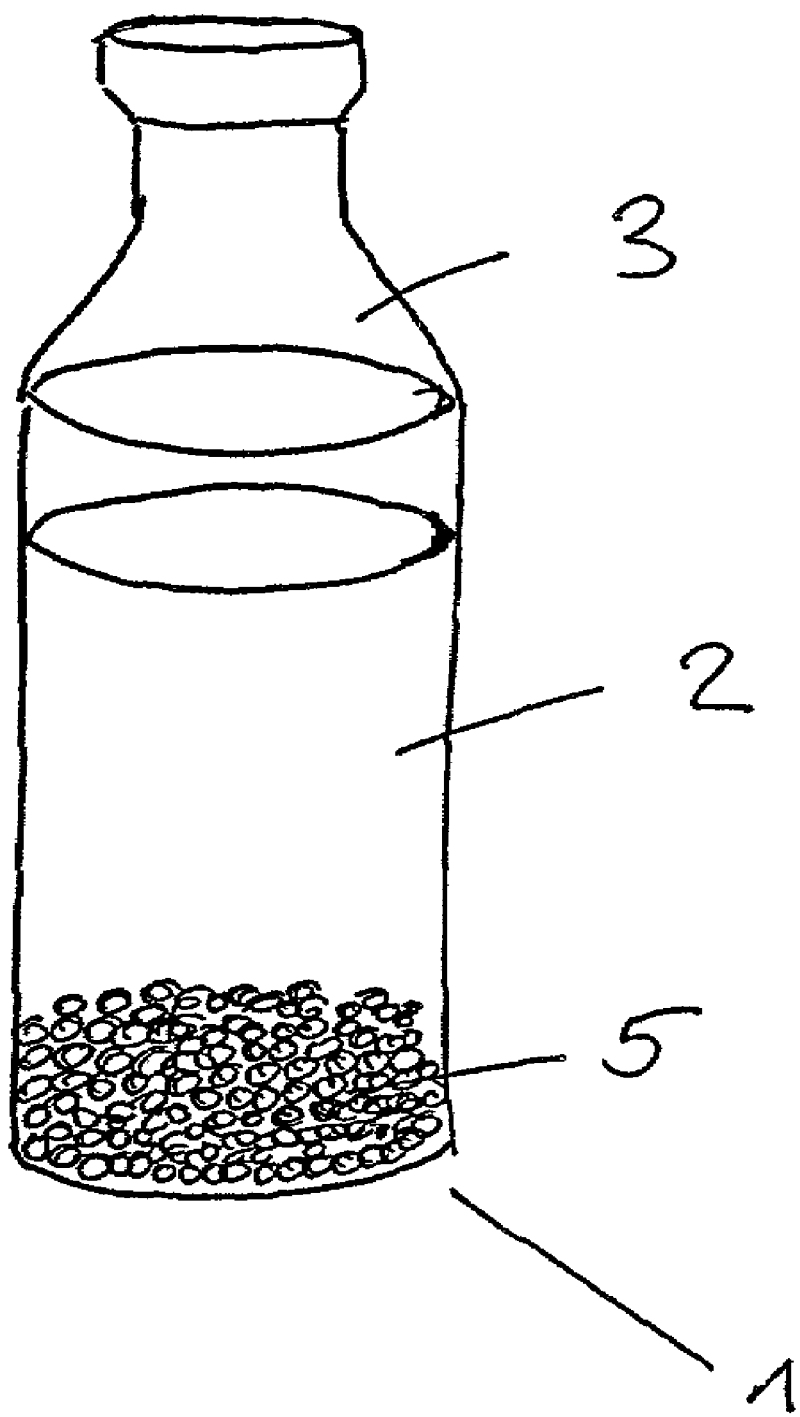
FIG. 2 depicts an embodiment of the testing device of the present invention, wherein the cavitation promoter comprises glass beads.

As shown in FIGS. 1 and 2, the testing device of the present invention comprises a vessel containing at least one fluid that produces an visibly discernable effect upon exposure to collapsing cavitation bubbles produced by the movement of ultrasonic waves generated by an ultrasonic cleaning device.

In one embodiment, the visibly discernable effect is a result of a change in the chemical composition of the fluid due to the release of energy from the collapsing cavitation bubbles. The visibly discernable effect may be, for example, a change in the color of the fluid, a change in the consistency of the fluid or a clouding of the fluid.

In this embodiment, the visibly discernable effect is the result of the naturally occurring reaction that takes place when ultrasonic waves are introduced into water or other aqueous solution. Molecules that are dissolved in the fluid contained within the testing device vessel are dissociated due to the energy that is released as the cavitation bubbles, produced by the movement of the ultrasonic waves through the fluid, collapse. The dissociated molecular components are now available as radicals that may either oxidize or reduce ions present in the fluid within the vessel.

The level or number of oxidized or reduced ions will thus constitute a measure of the energy released by the collapsing cavitation bubbles. Accordingly, the fluid within the vessel may include an analytical agent for analyzing the oxidized or reduced ions. The analysis is preferably performed by a discoloration or clouding of the fluid, with the alteration being initiated by a chemical reaction produced by the analytical agent. Such analytical agents are well known to those of skill in the art.

In one embodiment of the invention, the vessel may optionally contain a second fluid, which is preferably a gas bubble, which may comprise, for example, atmospheric air or a halogen gas such as, for example, $Cl_2$, $Br_2$ or $I_2$ gas. In this embodiment, the radicals released during cavitation oxidize or reduce the ions present within the gas bubble. This second fluid is of course, optional and the principles of the invention apply equally when the vessel is filled with only the first fluid.

As an element of the present invention is the production of an visibly discernable effect in the fluid contained within the vessel, the vessel is preferably designed to be transparent in at least a portion, such that the fluid is observable from the exterior of the vessel, although this is not a requirement. Preferably, the vessel will be formed of glass or a plastic.

In use, the testing device is place in the water basin of the ultrasonic cleaning device, such that the ultrasonic waves moving through the basin will also move through the fluid within the vessel of the testing device. Preferably, the vessel will be firmly, yet detachably, fixed within the water basin, by way of an appropriate holding fixture.

The location where the testing device is placed within the water basin should be such that it will provide a representative statement regarding the distribution of the ultrasonic waves moving through the water within the basin. As a means for providing a more detailed analysis of the distribution of the ultrasonic waves moving through the water basin, a plurality of testing devices may simultaneously be placed within the water basin. Differing cavitation densities, caused by the varying distribution of the ultrasonic waves, may then be determined optically, by means of the differing visibly discernable effect produced within each of the plurality of testing devices.

In order to ensure reliable and effective cavitation of the fluid within the vessel, the interior of the vessel may optionally contain a cavitation promoter or nucleus. Examples of such cavitation promoter may include, but are not limited to, appropriate projections of the interior wall of the vessel; freely movable objects, such as, for example, glass or other type beads or quartz sand; a rod-like or other projecting element extending into the fluid within the vessel; or a roughened, unsmooth interior surface of the vessel.

The testing devices depicted in FIG. 1 shows a vessel 1 filled with a first fluid 2, and a second fluid 3, and containing a rod-like projecting cavitation promoter 4. The device depicted in FIG. 2, again comprises a vessel 1 filled with a first fluid 2, and a second fluid 3, however, the cavitation promoter 5 is in the form of glass beads.

In a method utilizing either of the devices depicted in FIGS. 1 and 2, the first fluid 2 might comprise an aqueous sodium chloride solution, and the second fluid 3 might comprise a gas bubble of atmospheric air, whereby the chlorine in the aqueous NaCl solution would ultimately be oxidized. The first fluid 2 might then further comprise an analytical agent capable of analyzing the intensity of the color of the oxidized chlorine.

EXAMPLES OF THE PRINCIPLES OF THE INVENTION

Example 1

The vessel of the testing device contains 1.1 ml of an aqueous solution containing 20 mg of dissolved sodium chloride (a first fluid), and a volume of atmospheric air (a second fluid). During cavitation (which was promoted by the presence of 1.1 g of glass beads having diameters in the range of 1.25-1.55 mm) and the subsequent collapsing of cavitation bubbles, chloride ions are oxidized to chlorine by activated oxygen. The chlorine is analyzed by a commercial chlorine testing agent, such as tetramethylbenzidine, which causes a yellow coloration of the first fluid.

Example 2

During cavitation, an acidic aqueous solution of red phosphorous or phosphite ($PO_3^{3-}$) (first fluid) containing an analytical agent comprising molybdate and antimonium ions, is oxidized to produce phosphate. The phosphate then reacts with the molybdate and antimonium ions to form a complex that may be reduced to phosphorous molybdenum blue for analysis.

Further examples of the method include, but are not limited to, other systems that effect a discoloration by a reaction product or an analytical reaction, such as:

formaldehyde analysis with antimonium ions and acetylacetone; following oxidation of methanol, a yellow color appears;

redox systems such as: chromate/dichromate; $Ce^{3+}/Ce^{4+}$; $Fe^{2+}/Fe^{3+}$; and $Cu^+/Cu^{2+}$;

oxidation of halogenide ions such as $Cl^-$, $Br^-$ and $I^-$ to the corresponding halogens and their analysis by color reaction, or by UV-VIS spectrophotometry;

splitting off of halogens or hydrogen halide from haloorganic compounds such as chloroform, and their analysis;

oxidative or reductive decolorization of colorants;

oxidative or reductive formation of colorants; and polymerization of organic monomers.

Accordingly, the principles of the invention thus provide a means to easily determine the efficiency of the ultrasonic cleaning device, merely by removing the vessel from the water basin following a cleaning run, and optically observing the degree or intensity of the visibly discernable effect, e.g., the occurrence of a color alteration or the intensity of a color alteration of the fluid within the vessel.

To further facilitate the advantages of the present invention, a reference test may be run to determine a baseline visibly discernable effect that will indicate a desired cleaning efficiency of the ultrasonic cleaning device. For example, the baseline might be a particular color tone or color intensity, or a particular optical density of the altered fluid within the vessel. The analysis of the visibly discernable effect may be performed, for example, by a light barrier or other technical device for evaluating the clouding of fluids.

An additional advantage of the present invention resides in the reproducibility and preservability of the test results. For example, the altered fluid may be preserved for an extended period of time by freezing.

As a further advantage of the invention, it is desirable to provide a board or card upon which the relationship between the level of visibly discernable effect produced, and the degree of efficiency of the ultrasonic cleaning device is documented. As further tests are conducted, the effect may quickly and easily be compared to the documented results for an immediate determination of the cleaning efficiency.

Although the present invention has been described in terms of specific detailed embodiments, it will be appreciated by those skilled in the art that modifications or changes are possible without departing from the spirit of the invention described and taught herein. Such changes and modifications are therefore deemed to be within the scope of the this invention.

I claim:

1. A system for testing the efficiency of an ultrasonic cleaning device, comprising an ultrasonic cleaning device and a testing device, the testing device comprising a vessel containing at least one fluid that undergoes a visibly discernable change in color or color intensity upon exposure to collapsing cavitation bubbles produced by the movement of ultrasonic waves generated by the ultrasonic cleaning device, wherein a wall of the vessel is constructed to include at least a portion that is transparent, wherein the vessel further comprises a cavitation promoter comprising glass beads or quartz sand, and wherein the at least one fluid comprises least one of aqueous red phosphorus or phosphite, a methanol solution, a redox system solution, a halogenide ion solution, a haloorganic compound solution, an oxidative or reductive solution forming or decolorizing a colorant, and a solution polymerizing an organic monomer.

2. The system according to claim 1, wherein the at least one fluid comprises molecules dissolved therein for disassociation by energy released by the collapsing cavitation bubbles to form radicals that oxidize or reduce ions present in the at least one fluid.

3. The system according to claim 2, wherein the at least one fluid further comprises one or more analytical substances for analyzing oxidized or reduced ions, comprising one or more of molybdate and antimonium ions, antimonium ions and acetylacetone, dichromate, $Ce^{4+}$, $Fe^{3+}$ and $Cu^{2+}$.

4. The system according to claim 2, wherein the ions are oxidized to a halogen gas.

5. The system according to claim 1, wherein the at least one fluid comprises a first fluid and a second fluid.

6. The system according to claim 5, wherein the second fluid comprises a gas.

7. The system according to claim 6, wherein the gas comprises atmospheric air.

8. The system of claim 1, wherein the vessel further comprises a cavitation promoter integral with an interior surface of the vessel.

9. The system according to claim 8, wherein the cavitation promoter integral with an interior surface of the vessel comprises an unsmooth interior surface of the vessel.

10. The system according to claim 8, wherein the cavitation promoter integral with an interior surface of the vessel comprises an element projecting from the interior surface of the vessel.

11. A method for testing the efficiency of an ultrasonic cleaning device, the method comprising:
    (a) providing a testing device according to claim 1;
    (b) introducing the testing device into a water basin of the ultrasonic cleaning device;
    (c) running the ultrasonic cleaning device through a cleaning cycle; and
    (d) observing a visibly discernable change in color or color intensity produced by the at least one fluid within the testing device.

12. The testing method according to claim 11, wherein the visibly discernable change comprises alteration of the chemical composition of the at least one fluid within the vessel.

13. The testing method according to claim 12, wherein the alteration of the chemical composition of the at least one fluid within the vessel comprises oxidation or reduction.

14. The testing method according to claim 11, wherein a degree of change in color or color intensity of the at least one fluid within the vessel is an indicator of the efficiency of the ultrasonic cleaning device.

15. The testing method according to claim 14, further comprising documenting on a board or card, the relation between the degree of discoloration and the efficiency of the ultrasonic cleaning device.

16. A kit for testing the efficiency of an ultrasonic cleaning device, the kit comprising the system according to claim 1, and a board or card for documentation of the relation between the efficiency of the ultrasonic cleaning device and the visibly discernable change in color or color intensity.

17. A device for testing the efficiency of an ultrasonic cleaning device, the testing device comprising a vessel containing at least one fluid that undergoes a visibly discernable change in color or color intensity upon exposure to collapsing cavitation bubbles produced by the movement of ultrasonic waves generated by the ultrasonic cleaning device, wherein a wall of the vessel is constructed to include at least a portion that is transparent, wherein the vessel further comprises a cavitation promoter comprising glass beads or quartz sand, and wherein the at least one fluid comprises aqueous sodium chloride and a chlorine testing agent that causes a change in coloration of the at least one fluid in the presence of chlorine, the chlorine testing agent for analyzing oxidized chloride ions.

18. The system of claim 17, wherein the vessel further comprises a cavitation promoter integral with an interior surface of the vessel.

* * * * *